United States Patent [19]
Hart

[11] 3,858,558
[45] Jan. 7, 1975

[54] STRATIFIED CHARGE ROTARY ENGINE
[75] Inventor: Jack A. Hart, Mt. Clemens, Mich.
[73] Assignee: General Motors Corporation, Detroit, Mich.
[22] Filed: Nov. 21, 1973
[21] Appl. No.: 417,729

[52] U.S. Cl. .............................................. 123/8.13
[51] Int. Cl............................................. F02b 53/04
[58] Field of Search........................... 123/8.13, 8.09

[56]  References Cited
UNITED STATES PATENTS

| | | | |
|---|---|---|---|
| 3,255,737 | 6/1966 | Nallinger | 123/8.09 |
| 3,766,893 | 10/1973 | Tredway et al. | 123/8.09 |
| 3,780,707 | 12/1973 | Cole | 123/8.13 |
| 3,805,747 | 4/1974 | Nakagawa | 123/8.13 |

Primary Examiner—Carlton R. Croyle
Assistant Examiner—O. T. Sessions
Attorney, Agent, or Firm—Charles R. Engle

[57] ABSTRACT

A stratified charge rotary internal combustion engine having a housing including opposed end walls in conjunction with a central peripheral wall defining a rotor cavity. A rotor having opposite side walls and a peripheral surface planetates upon an eccentric on an output shaft defining work chambers of varying volume and compressing a regular air-fuel mixture for combustion as it rotates within the cavity. Precombustion chambers are positioned at predetermined locations in one of the rotor side walls and sequentially periodically connect with an inlet port in the adjacent housing end wall. The inlet port is positioned in the engine cycle in constant contact with an inlet vacuum supplying a carbureted rich air-fuel mixture to the precombustion chambers. A throat passage in the rotor connects each chamber with a peripheral surface of the rotor. A spark plug mounted in the adjacent housing end wall ignites the rich air-fuel mixture as the precombustion chambers sequentially periodically align with a sparking port in the wall. The ignited rich mixture burns through the throat passage and ignites the compressed regular air-fuel mixture on the rotor periphery within the rotor cavity.

6 Claims, 6 Drawing Figures

STRATIFIED CHARGE ROTARY ENGINE

This invention relates to a stratified charge rotary engine and more specifically to a rotary engine rotor having precombustion chambers in a side face for rotational communication with an auxiliary carburetor and subsequent firing by a side mounted spark plug.

Stratified charge engines have demonstrated an ability to operate with lower nitrous oxide emissions. A common method of obtaining a stratified charge in a reciprocating engine is to use two combustion chambers connected by a throat passage, each having its own fuel induction system. The smaller of the two connected combustion chambers receives a relatively rich mixture that could become as rich as two to one air-fuel ratio and usually has a volume of three to twenty percent of the volume of the main combustion chambers. The larger main combustion chamber receives a relatively lean air-fuel mixture usually in the range of twenty to one. During the compression stroke of the engine, fuel in the precombustion chamber is diluted somewhat as the lean mixture in the main chamber is forced into the smaller prechamber through the connecting throat passage. This reduces the relatively rich mixture to a more combustible mixture so that ignition occurs in the smaller chamber and spreads into the conventional chamber, this concept being sometimes referred to as torch ignition. The net effect is that the fuel burns at a lower temperature for longer time periods so as to reduce the formation of nitrous oxides.

Application of these known concepts to a rotary combustion engine is not an easy matter because the precombustion chamber must be connected to the main chamber near the top dead center position of the rotor so that the burning gases in the prechamber can flow through the throat passage igniting the charge in the main combustion chamber. If the prechamber is positioned in the engine housing, it always is in communication with the compressed gases in the main combustion chamber and the fuel supplied into the prechamber would have to be injected at a relatively high pressure. This eliminates the possibility of using an auxiliary carburetor to supply the rich mixture to the precombustion chamber. By forming the precombustion chambers in the rotor and spacing the inlet port away from the high pressure area of the engine cycles, the same vacuum utilized to draw in the main charger can be taken advantage of to supply the rich mixture into the precombustion chambers. The rotor rotates to a desirable point for ignition and the burning gases expand into the main chamber igniting the relatively lean mixture. Obviously, the inlet port supplying fuel to the precombustion chambers must be located where it is always subjected to a vacuum and this is the only location permitting use of an auxiliary carburetor to supply the rich mixture to the precombustion chambers.

The minimal space available in the engine housing structure and the usual rotor configuration are factors requiring consideration in positioning the precombustion chambers and the spark plug. Specifically, the structure of the rotary engine does not lend itself to providing a precombustion chamber or a second smaller combustion chamber in the peripheral wall of the engine casing because of interference with required cooling passages circumferentially around the rotor cavity defined by the engine housing. The second combustion chamber is required to be placed in the highest temperature area of the engine where area of the circulated coolant is critical and further the scrubbing or rubbing engagement of the peripheral rotor seals with the throat passage edges in this area is detrimental.

Accordingly, it is a primary purpose of this invention to provide precombustion chambers receiving a carbureted charge in a side face of a rotor. It is preferable to locate the precombustion chambers in a vacuum rear adjacent each apex of a triangularly shaped rotor between side wall mounted gas and oil seal assemblies. It is necessary that these chambers be located between these seal assemblies to eliminate positive pressures entering the precombustion chambers. A positive pressure between the seals prevents the vacuum from drawing a rich mixture from an auxiliary carburetor into the precombustion chambers. The precombustion chambers periodically communicate with a carbureted inlet port precisely positioned in a housing end wall so that each chamber receives a rich charge as the rotor passes the inlet port. Further rotation of the rotor places the precombustion chambers in alignment with a spark plug that is mounted in the engine housing end wall in a predetermined location to ignite the relatively rich mixture in the precombustion chamber, which at this time has been slightly diluted by the compressed main air-fuel mixture. Ignition of the relatively rich mixture in the precombustion chamber results in the compressed main air-fuel charge being ignited as the rich mixture torches through the connecting throat passage.

In a preferred form of the precombustion chambers, a sleeve type liner is secured within a drilled cavity which extends approximately two-thirds of the thickness of the rotor and opens toward the housing end wall containing the auxiliary inlet port and supporting the spark plug. The sleeve liner is configured including a slight flange which provides an air space around the sleeve when it is positioned within the drilled cavity. The provision of this air space insulates the sleeve from the rotor so that the sleeve remains at a higher temperature during operation and thereby enhances combustion of the relatively rich mixture therein. A small hole is drilled through the bottom portion of the cup-shaped sleeve which communicates with a substantially axially extending passage through the rotor to its opposite face where it connects with a slightly machined out area or cavity in the rotor side face so as to provide a counterbalancing area. In this manner, the gas pressures developed in the precombustion chamber are communicated to the opposite side of the rotor and the rotor is thereby counterbalanced for smooth rotation. An annular groove is provided in the rotor side wall adjacent the drilled hole receiving the cup-shaped sleeve liner. A spring biased annular sealing ring is positioned in the annular groove providing sealing engagement between the rotor side wall and the inner face of the engine end wall preventing leakage of combustion gases along the rotor side wall.

The precise location of the precombustion chambers adjacent the rotor apexes allows use of a maximum sized precombustion chamber and eliminates undesirable apex seal wear that would be incurred if the precombustion chamber is located in the engine housing where the rotor seals would rub across the throat passage. Also by positioning the precombustion chambers in the rotor side face, communication of the relatively rich air-fuel mixture from the auxiliary carburetor is enchanced. It is only necessary to provide a passage through the hollow water cooled section of the engine end wall directing the rich air-fuel mixture to a triangularly shaped inlet passage positioned to be fully open to the precombustion chambers at a precise time during rotor rotation. Likewise, positioning of the spark plug in the engine end wall minimizes mounting difficulties and additionally affords the advantage of not reducing the area of coolant adjacent the engine housing peripheral wall defining the high temperature working chambers.

Accordingly, a prime object of the present invention is the provision of a new and improved precombustion chamber provided in a rotor side face cooperating in timed relationship with an inlet passage constantly subjected to a vacuum and a spark plug mounted in an engine side wall.

Another object of the present invention is the provision of a stratified charge rotary engine having precombustion chambers formed in a rotor side face cooperating with an inlet passage in an engine side wall, the inlet passage receiving a relatively rich air-fuel mixture from an auxiliary carburetor, the charge being ignited by a side mounted spark plug and the burning gases passing through a throat passage igniting a main air-fuel mixture in a specifically timed relationship.

A further object of the present invention is the provision of a stratified charge rotary engine having precombustion chambers specifically positioned on a side face triangularly shaped rotor planetating within an engine housing cavity defining working chambers of varying volume during rotation therein, the precombustion chambers having a cup-shaped liner positioned therein with a circumferential air space therearound insulating the cup-shaped liner and maintaining it in a relatively heated condition aiding combustion of a rich air-fuel mixture received therein.

A still further object of the present invention is the provision of a stratified charge rotary engine having precombustion chambers located adjacent each apex of a triangularly shaped rotor, the precombustion chambers having a cup-shaped sleeve liner secured therein, a small passage provided in the bottom surface of the cup-shaped liner which communicates with a like axial passage in the rotor which extends to the opposite side face thereof and connects with a recessed balancing area therein so that combustion pressures generated in the precombustion chamber are transmitted through the small passages to the opposite side of the rotor balancing the rotor during its rotation.

Another object of the present invention is the provision of a stratified charge rotary engine including a triangularly shaped rotor having precombustion chambers positioned in a side face adjacent each apex thereof, the precombustion chambers receiving a relatively rich air-fuel mixture from a side inlet passage formed in an engine side plate, the rich air-fuel mixture being supplied by an auxiliary carburetor, and the precombustion chambers aligning with an access port in the engine side plate which receives a spark from a side mounted spark plug in a precise timed relationship, the positioning of the air-fuel inlet passage and the spark plug in the engine side plate providing for normal cooling of the engine.

The novel features which I believe to be characteristic of my invention are set forth with particularity in the appended claims. My invention itself, however, both as to its organization and method of operation, may be best understood by reference to the following description taken in connection with the accompanying drawings in which:

Figure 1:
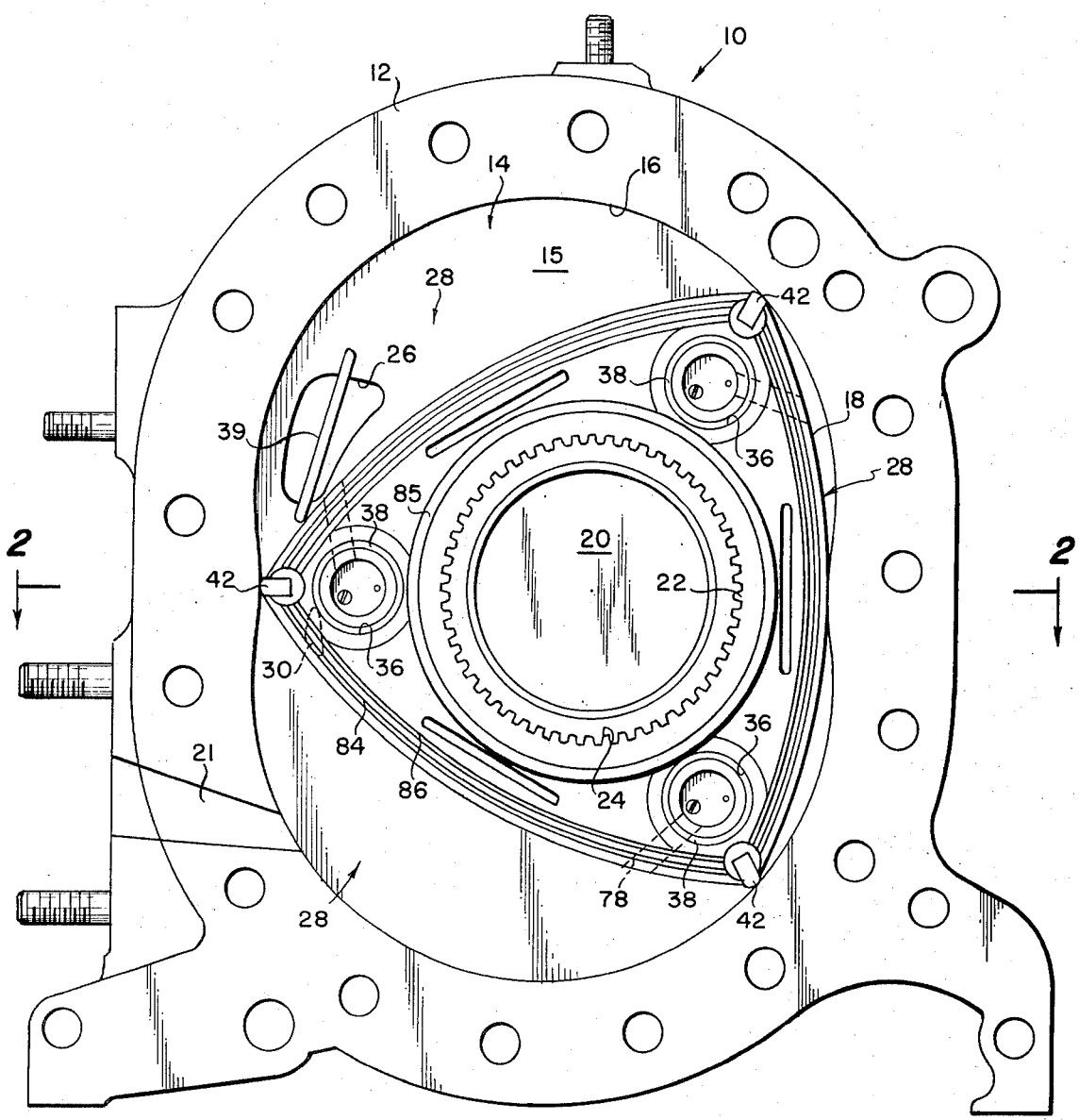
FIG. 1 is a side plan view illustrating a rotary internal combustion engine rotor having precombustion chambers formed therein in accordance with my invention, the rotor being shown disposed within a central engine housing member.

With reference now to FIG. 1 a rotary engine housing 10 is shown as including a central housing section 12 enclosed on the rear side by a rear housing member 14. The central housing section 12 defines a two-lobed trochoidal chamber 16 rotatably receiving a triangularly shaped rotor 18 planetating about a crankshaft 20 by virtue of meshed phasing gears 22 and 24. The rear housing member 14 has a main or regular fuel inlet port 26 formed in rear end wall 15 for supplying a main relatively lean air-fuel mixture to working chamber 28 which vary in volume as the rotor 18 planetates relative to crankshaft 20 while rotating within trochoidal cavity 16. The cavity 16 connects with an exhaust passage 21 which is illustrated as being formed in the central housing section but can also be formed in either the front or rear end housing members. A second air-fuel inlet port 30 shown in phantom, is precisely positioned in the front housing member 40 to supply a relatively rich air-fuel mixture to precombustion chambers formed near each of the apexes of the triangular shaped rotor 18 as will be later described in detail. A rear rotor side wall 32 contains shallow recessed areas 34 adjacent each of the rotor apexes. The shallow recesses 34 are circular in form and have annular seal grooves 36 containing seals 38 circumscribing the recesses preventing flow of pressurized gases from the recesses. The seals 38 are spring biased outwardly into continual engagement with rear housing end wall 15 during rotation of rotor 18. A seal bar 39 is secured in rear end wall 15 and extends across inlet port 26 preventing the seals 38 from expanding out of grooves 36 into the port.

Figure 2:
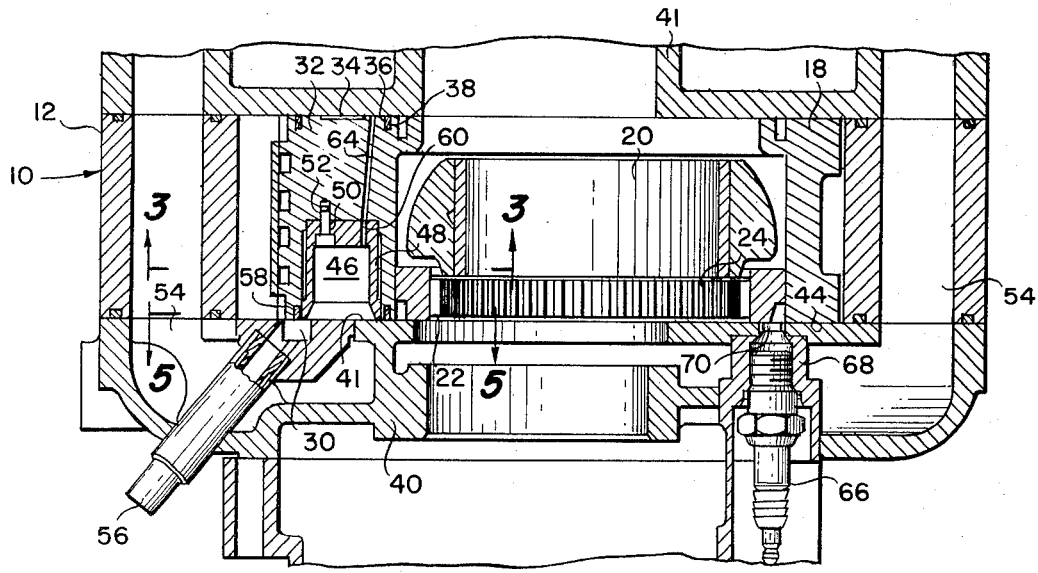
FIG. 2 is a fragmentary sectional view taken on line 2—2 of FIG. 1.

Referring now to FIG. 2, the central housing section 12 is enclosed by the rear housing member 14 providing the inner wall 15 on one side and is enclosed by front housing member 40 likewise providing an inner wall 41 on the other side. The rotor 18 includes an apex seal 42 at each apex 43 which is spring biased to engage the surface defining trochoidal chamber 16 as the rotor rotates within the chamber 16 so that each working chamber 28 is sealed from the adjacent chambers as the volume varies during intake compression, combustion and exhaust cycles. A front side wall 44 of the rotor 18 contains a precombustion chamber 46 receiving a cup-shaped liner member 48 secured in the bottom of the chamber 46 by means of a machine screw 50 engaging a tapped hole 52 in the rotor 18. Seal grooves 36 each circumscribe the precombustion chambers 46 and contain a spring biased seal 38 continually engaging front housing end wall 15 sealing the chambers 46 in the same manner as the balancing cavities 34. The front housing member 14 contains coolant cavities 54 which direct pressurized coolant adjacent the combustion areas of the engine housing members 12, 14 and 40. A conduit 56 connecting with an auxiliary carburetor, not shown, directs a rich air-fuel mixture to the inlet port 30 which in turn communicates with the precombustion chambers 46 as rotor 18 rotates and opens the precombustion chambers to the inlet port 30.

The cup-shaped liner 48 includes an external flange 58 at its open end and contains a small aperture 60 through the bottom portion 62 thereof. The rotor 18 includes a similar small passage 64 which aligns with passage 60 in liner 48 and is in communication with the aforementioned recessed areas 34 formed in the rear side 32 of rotor 18. The passages 60, 64 and the recessed areas 34 are provided for balancing the rotor during combustion of the relatively rich air-fuel mixture in the precombustion chambers 46. The front housing member 40 also supports a spark plug 66 secured in threaded boss 68 integral with front housing member 40 so that the spark plug electrode is in alignment with a sparking port 70 positioned for directing sparking fire into the precombustion chambers at a specific time during rotation of rotor 18.

Figure 3:
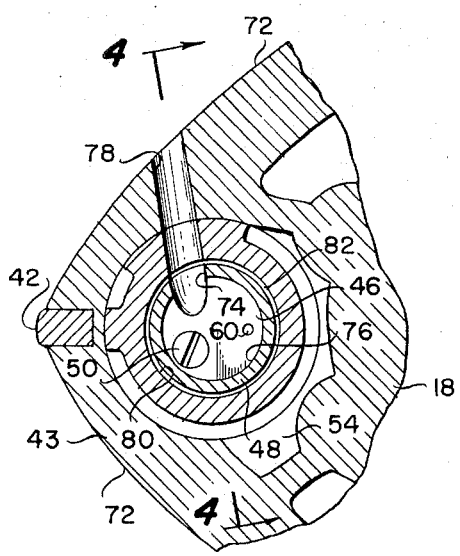
FIG. 3 is an enlarged fragmentary sectional view taken on line 3—3 of FIG. 2.

As is best shown in FIG. 3, the rotor 18 includes peripheral surfaces 72 which, as has been previously discussed with reference to FIG. 1, cooperate with the surfaces of trochiodal chamber 16 to define three separate working chambers 28 of varying volume during rotation of the rotor 18. The cup-shaped liners 48 defining the precombustion chambers 46 at each apex 43 of the rotor 18 each have an aperture 74 in a side wall 76 connecting with respective ignition throat passages 78 formed in the rotor 18. The passages 78 are positioned to connect with and transmit the burning mixture from the precombustion chambers 46 to an associated peripheral surface 72 when it is positioned adjacent the minimum axis of the trochoidal chamber so that the working chamber defined between the peripheral surface 72 and the surfaces of the trochoidal surface 16 is at a minimum volume and the main air-fuel mixture is compressed.

Figure 4:
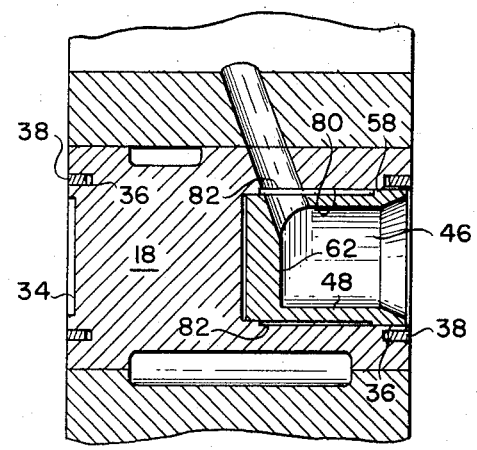
FIG. 4 is a fragmentary sectional view taken on line 4—4 of FIG. 3.

As shown in FIGS. 3 and 4, the flange 58 formed at the open end of the cup-shaped liner 48 cooperates with a bore 80 in piston 18 defining a circumferentially extending cavity 82 about the exterior surface of the cup-shaped liner 48 providing an insulating air space in the cavity 82. The provision of the cavity 82 about the exterior surface of the cup-shaped liner 48 insulates and maintains the liner in a heated condition for better ignition of the rich air-fuel mixture received therein during engine operation.

Figure 5:
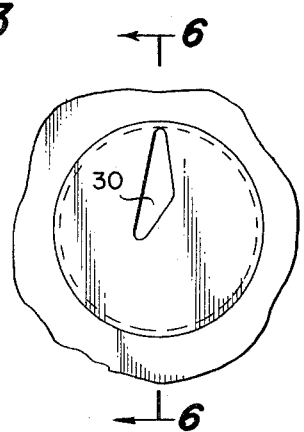
FIG. 5 is an enlarged fragmentary view taken on line 5—5 of FIG. 2.
Figure 6:
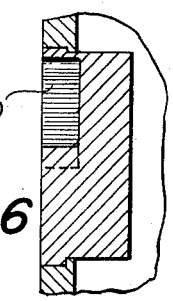
FIG. 6 is an enlarged fragmentary sectional view taken on line 6—6 of FIG. 5.

With reference now to FIGS. 5 and 6, the rich air-fuel inlet port 30 in front housing member 40 is configured in a substantially triangular shape to provide a maximum area for supplying the rich air-fuel mixture to the precombustion chambers 46 as they align therewith during rotor rotation. The configuration of this port is particularly significant in that it is desirable to avoid contact between the port 30 and the dual gas seals 84 and 86 which are normally used in rotor side faces and are illustrated in FIG. 1. It is necessary to keep positive pressure gases out of the inlet port 30 so that the prevailing vacuum is effective to draw in the rich carbureted mixture from the auxiliary carburetor. It is for this reason that the rich air-fuel intake port 30 is configured as shown in FIG. 5 and is positioned along with the precombustion chambers 46 to be continually in the area of the rotor between gas seals 84 and 86 and oil seal 85 wherein they are in constant contact with an inlet vacuum.

In operation, rotor 18 planetates relative to crankshaft 20 while rotating with the trochoidal cavity 16. As it does so, it sequentially and periodically positioned each of the three precombustion chambers 46 in alignment with inlet port 30 whereby the chamber 46 is filled with a rich air-fuel mixture from an auxiliary carburetor not shown. The respective annular seals 38 maintain their engagement with end wall 41 retaining the mixture within the precombustion chamber 46 as the rotor 18 continues rotation. The peripheral surface 72 associated with its respective filled chamber 46 begins to approach the surface of engine housing section 12 defining the trochoidal cavity 16 and start compression of a lean or main air-fuel mixture supplied to the working chamber 28 through inlet port 26. Continued rotation of rotor 18 to a position where the peripheral surface 72 is substantially normal to the minor trochoidal axis or at a top dead center position fully compresses the main air-fuel mixture and during this time as the pressure of the mixture increases, a portion flows into the precombustion chamber diluting the rich air-fuel mixture therein making it more readily combustible. At this time, with the surface 72 in the vicinity of the top dead center position, the filled precombustion chamber 46 is aligned with sparking port 70 and spark plug 66 is fired igniting the rich mixture. The burning gases expand through the throat passage 78 and ignite the main charge. In this manner a longer burning time at a lower temperature results which is effective to substantially reduce undesirable exhaust gas emissions as is well known with stratified charge engines.

The ignition of the rich mixture in the precombustion chambers 46 creates a substantial pressure on the front side wall 44 of rotor 18. To compensate for this change in pressure, apertures 60 in liners 48 and passages 64 in the rotor 18 are provided to connect with respective balancing cavities 34 having an area equal to the precombustion chambers 46. The burning gases rapidly expand to the cavities 34 and thereby balance the rotor 18 for smooth rotation as it planetates on the crankshaft 20.

While I have shown and described a particular embodiment of my invention it wll, of course, be understood that various modifications and alternative constructions thereof may be made without departing from the true spirit and scope of my invention and that I intend by the appended claims to cover all such modifications and alternative constructions as fall within the true spirit and scope of my invention.

I claim:

1. A stratified charge rotary internal combustion engine comprising a housing including opposed end walls in conjunction with a central peripheral wall defining a cavity, a rotor, an output shaft, an eccentric on said output shaft, said rotor planetating on said eccentric as it rotates within said cavity compressing a regular relatively lean air-fuel mixture for combustion therein, said rotor having opposite side walls each facing an adjacent one of said housing end walls, at least one precombustion chamber formed in one of said rotor side walls opening toward said adjacent housing end walls, means supplying a relatively rich air-fuel mixture to a supply inlet port strategically positioned in said adjacent housing end wall, a throat passage in said rotor connecting said precombustion chamber with said rotor cavity wherein said relatively lean air-fuel mixture is compressed, and ignition means mounted in said adjacent housing end wall igniting the relatively rich air-fuel mixture in said precombustion chamber at a precise time during rotation of said rotor whereby the ignited rich mixture burns through said throat passage torch igniting said relatively lean air-fuel mixture compressed by said rotor in said cavity.

2. A stratified charge rotary internal combustion engine comprising a housing including opposed end walls in conjunction with a central peripheral wall defining a cavity within the housing, a rotor, an output shaft, an eccentric on said output shaft, said rotor planetating on said eccentric as it rotates within said cavity compressing a regular relatively lean air-fuel mixture for combustion therein, said rotor having opposite side walls each facing an adjacent one of said housing end walls, at least one precombustion chamber formed in one of said rotor side walls opening toward said adjacent housing end wall, a cup-shaped liner positioned within said precombustion chamber and formed to define in conjunction with the precombustion chamber a circumferential insulating air space thereabout, means supplying a relatively rich air-fuel mixture to a supply inlet port strategically positioned in said adjacent housing end wall, a throat passage in said rotor connecting said precombustion chamber with said rotor cavity wherein said relatively lean air-fuel mixture is compressed, and ignition means mounted in said adjacent housing end wall igniting the relatively rich air-fuel mixture in said precombustion chamber at a precise time during rotation of said rotor whereby the ignited rich mixture burns through said throat passage torch igniting said relatively lean air-fuel mixture compressed by said rotor in said cavity.

3. A stratified charge rotary internal combustion engine as described in claim 2 further comprising a balancing cavity formed in the rotor side wall opposite to said one rotor side wall containing said precombustion chamber, said cup-shaped liner having an aperture in the bottom thereof connecting with a passage through said rotor to said balancing cavity, said one rotor wall having a circumferential groove formed therein adjacent said precombustion chamber and a spring biased gas seal positioned in said circumferential groove continually being biased into engagement with said adjacent housing end wall thereby sealing the rich air-fuel mixture within said precombustion chamber as said rotor rotates with said cavity.

4. A stratified charge rotary internal combustion engine comprising a housing including opposed front and rear end walls which in combination with a central peripheral wall define a multi-lobed cavity therein, a multi-apex rotor, an output shaft, an eccentric on said shaft, said rotor planetating on said eccentric as it rotates within said cavity, said rear housing end wall containing an inlet port, a main carburetor supplying a relatively lean air-fuel mixture to said rear housing inlet port, a seal supporting bar in said rear housing end wall extending across said main inlet port, said rotor compressing the relatively lean air-fuel mixture supplied through said rear housing inlet port, said rotor having opposite side walls each facing an adjacent one of said housing front and rear end walls, a precombustion chamber formed adjacent each apex in one of said rotor side walls opening toward said front housing end wall, a cup-shaped combustion liner positioned in each precombustion chamber and secured therein, said cup-shaped liners being formed so that their exterior circumferential surface cooperates with the rotor surface defining said precombustion chambers to provide a circumferentially extending air insulating space thereabout, said rotor having a balance cavity formed in the side wall facing toward said rear housing end wall, said cup-shaped liner having an aperture in the bottom surface thereof, said rotor further having a balance passage connecting with the aperture in the bottom of said cup-shaped liner and the balance cavity in said rotor side wall facing toward said rear housing end wall, said rotor side walls having seal grooves formed therein circumscribing said precombustion chambers and said balance cavities, spring biased annular seals positioned in said circumscribing grooves continually engaging respective front and rear housing end walls sealing gas pressures within said precombustion chambers and said balance cavities, said seal supporting bar retaining said balance cavity seals in place as they pass across said inlet port in said rear housing wall, an auxiliary carburetor supplying a relatively rich air-fuel mixture to an inlet port strategically positioned in said front housing end wall, said precombustion chambers sequentially and periodically connecting with the front housing wall inlet port and being filled with a rich air-fuel mixture, respective throat passages in said rotor connecting each of said precombustion chambers with said multi-lobed rotor cavity wherein said relatively lean air-fuel mixture is compressed, and ignition means mounted in said adjacent front housing end wall igniting the relatively rich air-fuel mixture in each of said precombustion chambers at a precise time during rotation of said rotor whereby the ignited rich mixture burns through said passage torch igniting said relatively lean air-fuel mixture compressed by said rotor in said cavity.

5. A stratified charge rotary internal combustion engine comprising a housing having an interior substantially trochoidal peripheral wall and a pair of oppositely facing first and second interior end walls defining a rotor cavity, an output shaft rotatably mounted in said housing, an eccentric on said output shaft and located within said rotor cavity, a triangular rotor rotatably mounted on said eccentric, said rotor having oppositely facing side walls adjacent each of said housing end walls and three peripheral surfaces facing said housing peripheral wall, said rotor surfaces and said housing walls cooperating to provide a plurality of working chambers that are spaced about and move with said rotor within said housing while varying in volume as said rotor planetates, gas seal means mounted on said rotor for contacting said housing walls sealing said working chambers from each other, intake passage means including an intake port in said first one of said housing walls located so that said working chambers are sequentially periodically opened by said rotor past said gas seal means to said intake port as said rotor planetates so as to receive a lean air-fuel mixture therein as said rotor planetates, exhaust passage means including an exhaust port located in one of said housing walls so that said working chambers are sequentially periodically opened by said rotor past said gas seal means to said exhaust port as said rotor planetates, said rotor having annular precombustion chambers formed in one of said side walls adjacent each rotor apex radially inwardly of said gas seal means, said precombustion chambers opening toward said second housing end wall, said rotor further having throat passages connecting each precombustion chamber with respective working chambers, said opposite rotor side wall having annular balancing cavities formed therein axially opposite each of said precombustion chambers, said rotor containing a passage connecting said precombustion chambers with said balancing cavities, said rotor containing annular sealing grooves circumscribing said chambers and said balancing cavities, spring biased annular seals in said grooves engaging said first and second housing end walls preventing gas flow from said chambers and said balancing cavities, auxiliary inlet passage means in said opposite housing end wall including an auxiliary intake port located so that said precombustion chambers are sequentially periodically aligned with said auxiliary intake port so as to receive a rich air-fuel mixture therein as said rotor planetates, continued rotation of said rotor forcing a portion of said lean air-fuel mixture into said precombustion chambers through said throat passages making said rich mixture combustible, and a spark plug mounted in said opposite housing end wall and being located so that said precombustion chambers are sequentially periodically aligned with the spark plug for ignition of the rich air-fuel mixture therein whereby the burning rich gases expand through said throat passages igniting a lean air-fuel mixture in a respective compressed working chamber.

6. A stratified charge rotary internal combustion engine as described in claim 5 further comprising an oil seal inwardly of said precombustion chambers in said one of said rotor side walls and an auxiliary carburetor supplying the rich air-fuel mixture to said auxiliary inlet port whereby said precombustion chambers are sealed from positive pressures so that inlet vacuum is continuously effective to draw in the rich mixture from said auxiliary carburetor.

* * * * *

PO-1050
(5/69)

UNITED STATES PATENT OFFICE
CERTIFICATE OF CORRECTION

Patent No. __3,858,558__        Dated __January 7, 1975__

Inventor(s)        __Jack A. Hart__

It is certified that error appears in the above-identified patent and that said Letters Patent are hereby corrected as shown below:

Column 1, line 47, "charger" should read -- charge --. Column 2, line 8, "rear" should read -- area --. Column 6, line 9, "positioned" should read -- positions --; line 39, after "pressure" insert -- increase --; line 49, "wll" should read -- will --. Column 8, line 16, "said" (first occurrence) should read -- side --. Column 10, line 3, after "mixture" insert -- more --.

Signed and sealed this 29th day of April 1975.

(SEAL)
Attest:

RUTH C. MASON
Attesting Officer

C. MARSHALL DANN
Commissioner of Patents
and Trademarks